US010232607B2

United States Patent
Sato et al.

(10) Patent No.: US 10,232,607 B2
(45) Date of Patent: Mar. 19, 2019

(54) LIQUID DROPLET DISCHARGING CONTROL DEVICE, LIQUID DROPLET DISCHARGING CONTROL METHOD, AND LIQUID DROPLET DISCHARGING APPARATUS

(71) Applicant: SEIKO EPSON CORPORATION, Tokyo (JP)

(72) Inventors: Akito Sato, Nagano (JP); Naoki Sudo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 61 days.

(21) Appl. No.: 15/460,814

(22) Filed: Mar. 16, 2017

(65) Prior Publication Data

US 2017/0282541 A1 Oct. 5, 2017

(30) Foreign Application Priority Data

Mar. 29, 2016 (JP) .................................. 2016-065209

(51) Int. Cl.
*B41J 2/045* (2006.01)
*B41J 2/21* (2006.01)
(Continued)

(52) U.S. Cl.
CPC ....... *B41J 2/04508* (2013.01); *B41J 2/04586* (2013.01); *B41J 2/2139* (2013.01);
(Continued)

(58) Field of Classification Search
CPC .. B41J 2/04508; B41J 2/04586; B41J 2/2139; H04N 1/4057; H04N 1/6016; H04N 1/6022; H04N 1/6097; G06K 2215/0094
See application file for complete search history.

(56) References Cited

U.S. PATENT DOCUMENTS

2013/0293611 A1* 11/2013 Ueshima .................. B41J 2/125
347/12
2015/0258785 A1 9/2015 Sudo et al.
(Continued)

FOREIGN PATENT DOCUMENTS

JP 09-024609 A 1/1997
JP 2004-174816 A 6/2004
(Continued)

OTHER PUBLICATIONS

The Extended European Search Report for the corresponding European Patent Application No. 17163300.1 dated Aug. 31, 2017.

*Primary Examiner* — Thinh H Nguyen

(57) ABSTRACT

There is a provided a liquid droplet discharging control device which causes a liquid droplet discharging apparatus including a head, in which a plurality of nozzles are arranged in a predetermined direction, to perform printing and which is capable of executing a nearby compensation process in which, on the basis of a dot position on which a predetermined nozzle for black ink forms a dot, a nearby nozzle that forms a dot in the vicinity of the dot forms a dot and executing a composite compensation process. The liquid droplet discharging control device includes a parameter acquiring unit that acquires parameters corresponding to the degree of liquid spreading toward a periphery after adhesion of a liquid droplet to a medium, and a compensation switching unit that switches between execution of the nearby compensation process and execution of the composite compensation process on the basis of the parameters.

10 Claims, 11 Drawing Sheets

(51) Int. Cl.
*H04N 1/60* (2006.01)
*H04N 1/405* (2006.01)

(52) U.S. Cl.
CPC ......... *H04N 1/4057* (2013.01); *H04N 1/6016* (2013.01); *H04N 1/6022* (2013.01); *H04N 1/6097* (2013.01); *G06K 2215/0094* (2013.01)

(56) References Cited

U.S. PATENT DOCUMENTS

| | | |
|---|---|---|
| 2015/0314591 A1 | 11/2015 | De Grijs |
| 2015/0375499 A1 | 12/2015 | Sato et al. |
| 2015/0375503 A1 | 12/2015 | Sato et al. |
| 2016/0136983 A1* | 5/2016 | Koehler ................. B41J 29/393 347/19 |

FOREIGN PATENT DOCUMENTS

| | | |
|---|---|---|
| JP | 2015-174395 A | 10/2015 |
| JP | 2016-007824 A | 1/2016 |
| JP | 2016-007825 A | 1/2016 |

\* cited by examiner

| (a) | (b) | (c) | (d) | (e) | (f) | (g) | (h) |
|---|---|---|---|---|---|---|---|
| L×K | L×L | KCK | C×C | L×C | LCK | LCL | CCC |
| | | | | | | | |
| 3 | 4 | 5 | 6 | 6 | 6 | 7 | 9 |

| (a) | (b) | (c1) | (c2) | (d) | (e) | (f1) | (f2) | (f3) | (g) | (h) |
|---|---|---|---|---|---|---|---|---|---|---|
| L<br>×<br>×<br>K | L<br>×<br>×<br>L | K<br>C<br>×<br>K | K<br>C<br>C<br>K | C<br>×<br>×<br>C | L<br>×<br>×<br>C | L<br>C<br>×<br>K | L<br>×<br>C<br>K | L<br>C<br>C<br>K | L<br>C<br>C<br>L | C<br>C<br>C<br>C |
|  |  |  |  |  |  |  |  |  |  |  |
| 3 | 4 | 5 | 8 | 6 | 5 | 6 | 6 | 9 | 10 | 12 |

FIG. 11
COMPENSATION PROCESS SELECTION
—SELECT ANY ONE COMPENSATION PROCESS—
a b c d e f g h
FIG. 12A
GLOSSY PAPER
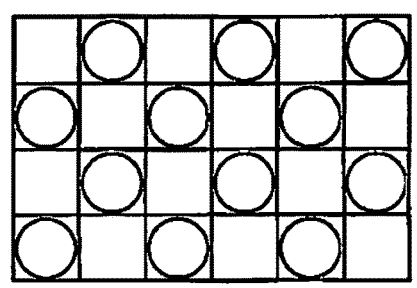
FIG. 12B
PLAIN PAPER
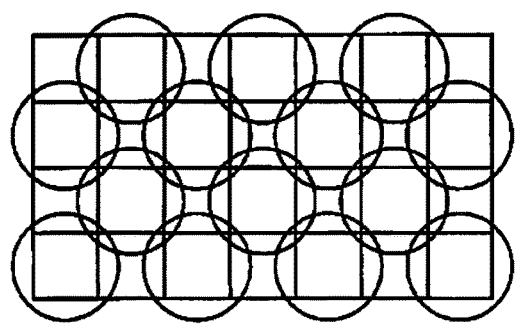

LIQUID DROPLET DISCHARGING CONTROL DEVICE, LIQUID DROPLET DISCHARGING CONTROL METHOD, AND LIQUID DROPLET DISCHARGING APPARATUS

BACKGROUND

1. Technical Field

The present invention relates to a liquid droplet discharging control device, a liquid droplet discharging control method, and a liquid droplet discharging apparatus.

2. Related Art

In a line printer, a nozzle may fail so that the nozzle cannot discharge liquid droplets. Such a nozzle will be referred to as an omission nozzle. In a line printer, an omission nozzle is always in a fixed position while a paper sheet is being transported. Therefore, when liquid droplets are not discharged, a white line is generated.

Therefore, a compensation recording method, which compensates for a portion corresponding to the omission nozzle by changing the sizes of dots discharged from nozzles in the vicinity of the omission nozzle, has been known.

JP-A-9-24609 discloses a technique which increases the sizes of dots to be formed by nozzles adjacent to the omission nozzle in order to make dot omission attributable to the omission nozzle not noticeable.

JP-A-2004-174186 discloses a technique which forms a composite black dot instead of a black dot in order to make dot omission attributable to the omission nozzle not noticeable in a case where a nozzle for black ink is an omission nozzle.

There are known several compensation methods which make dot omission attributable to the omission nozzle not noticeable. However, a user cannot switch the compensation methods according to the actual printing status.

SUMMARY

An advantage of some aspects of the invention is to provide compensation recording methods which a user can switch.

According to an aspect of the invention, there is provided a liquid droplet discharging control device which causes a liquid droplet discharging apparatus including a head, in which a plurality of nozzles are arranged in a predetermined direction, to perform printing and which is capable of executing a nearby compensation process in which, on the basis of a dot position on which a predetermined nozzle for black ink forms a dot, a nearby nozzle that forms a dot in the vicinity of the dot forms a dot and executing a composite compensation process in which dots of a plurality of different colors are overlap-printed on a predetermined dot position. The liquid droplet discharging control device includes a parameter acquiring unit that acquires parameters corresponding to the degree of liquid spreading toward a periphery after adhesion of a liquid droplet to a medium, and a compensation switching unit that switches between execution of the nearby compensation process and execution of the composite compensation process on the basis of the parameters.

In this configuration, in a case where the nearby compensation process in which, on the basis of a dot position on which a predetermined nozzle for black ink forms a dot, a nearby nozzle that forms a dot in the vicinity of the dot forms a dot and the executing a composite compensation process in which dots of a plurality of different colors are overlap-printed on a predetermined dot position can be executed, when the parameter acquiring unit acquires parameters corresponding to the degree of liquid spreading toward a periphery after adhesion of a liquid droplet to a medium, and the compensation switching unit switches between execution of the nearby compensation process and execution of the composite compensation process on the basis of the parameters.

Accordingly, a user can switch between the compensation processes according to the dot infiltration way in the actual printing status.

BRIEF DESCRIPTION OF THE DRAWINGS

The invention will be described with reference to the accompanying drawings, wherein like numbers reference like elements.

FIG. 11 is a diagram illustrating an input screen (UI) of a selected color patch.

FIGS. 12A and 12B are diagrams illustrating the correspondence relationship between infiltration and density.

DESCRIPTION OF EXEMPLARY EMBODIMENTS

First Embodiment

Hereinafter, embodiments of the invention will be described with reference to the drawings.

Figure 1:
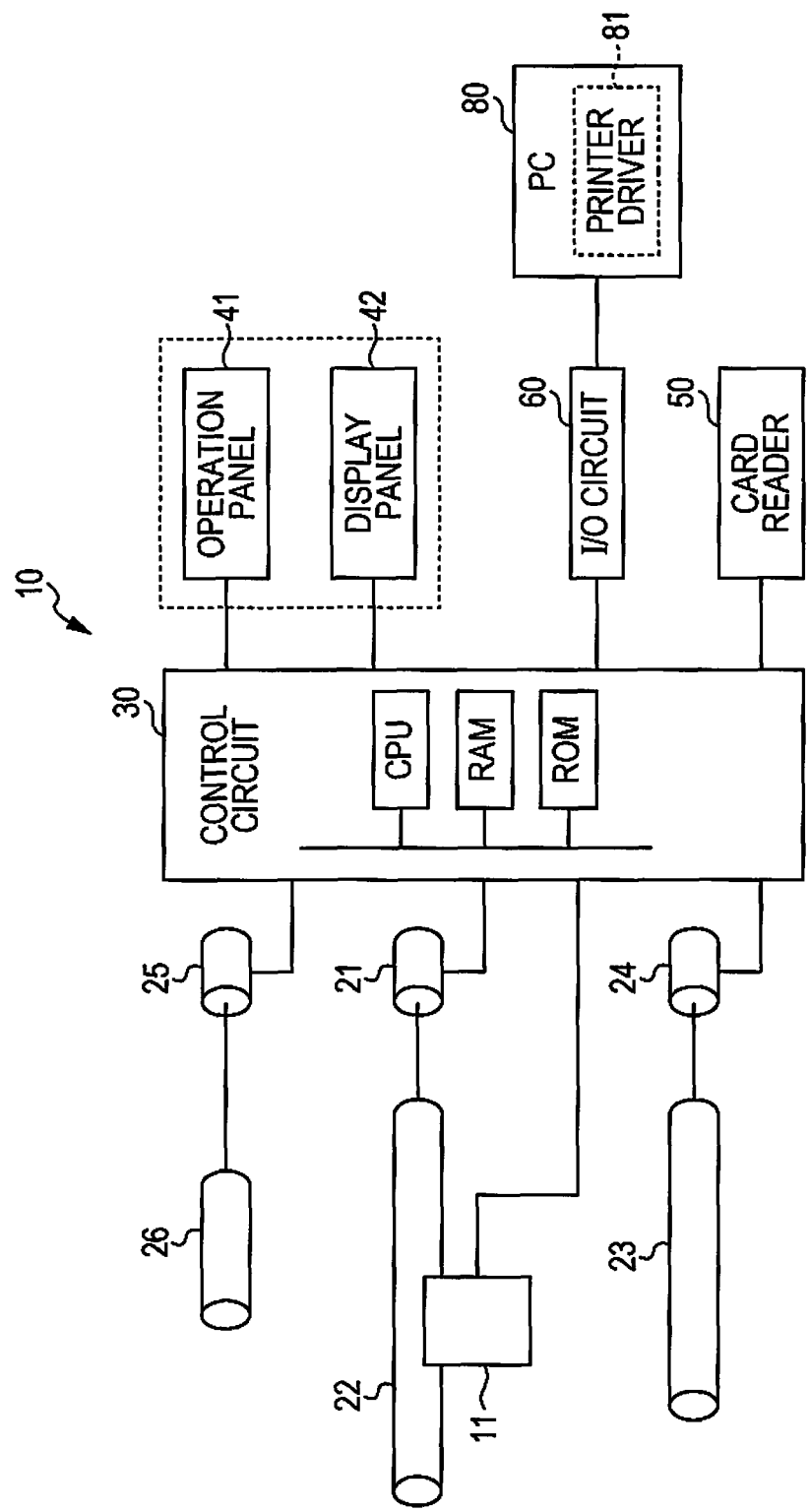
FIG. 1 is a schematic block diagram of an ink jet printer to which the invention is applied.

FIG. 1 is a schematic block diagram of an ink jet printer to which the invention is applied.

A printing head (a head) 11 of a printer (a liquid droplet discharging apparatus) 10 in FIG. 1 discharges four or six colors of ink, which are supplied from an ink tank, via a nozzle. The printing head 11 is driven to reciprocate within a predetermined range by a belt 22 which is driven by a carriage motor 21. A platen 23 is driven by a platen motor 24 and transports a paper sheet in accordance with the reciprocating operation of the printing head 11. A feed motor 25 drives a paper feeding roller 26 which supplies the paper sheet accommodated in a predetermined paper sheet stacker. A type of a printer in which the printing head 11 reciprocates in accordance with transportation of the paper sheet as described above is called a serial printer. In a serial printer, a direction in which nozzle rows are arranged is parallel to a paper feeding direction.

A control circuit 30 is configured by assembling dedicated ICs, and includes a CPU, a ROM, and a RAM in terms of function. The control circuit 30 controls driving of the printing head 11, the carriage motor 21, the platen motor 24, and the feed motor 25. An operation panel 41 and a display panel 42 are mounted on the control circuit 30. The control circuit 30 receives a predetermined operation from a user via the operation panel 41 and performs a predetermined displaying operation via the display panel 42. The above-described pieces of hardware are collectively called a printing mechanism.

The control circuit 30 is connected to a card reader 50 and when a detachable memory card is mounted on the control circuit 30, the control circuit 30 can read data from the memory card and can record predetermined data in the memory card. In addition, the control circuit 30 is connected to an I/O circuit 60 and can be connected to another external device via communication in a wired or wireless manner. The control circuit 30 acquires a data file of an image from the external device or the memory card and performs printing by controlling the device on the basis of the data file. Note that, the control circuit 30 is connected to an external PC 80 via the I/O circuit 60 and the PC 80 generates predetermined printing control data by using a printer driver 81 in the PC 80 and transmits the printing control data to the control circuit 30.

Figure 2:
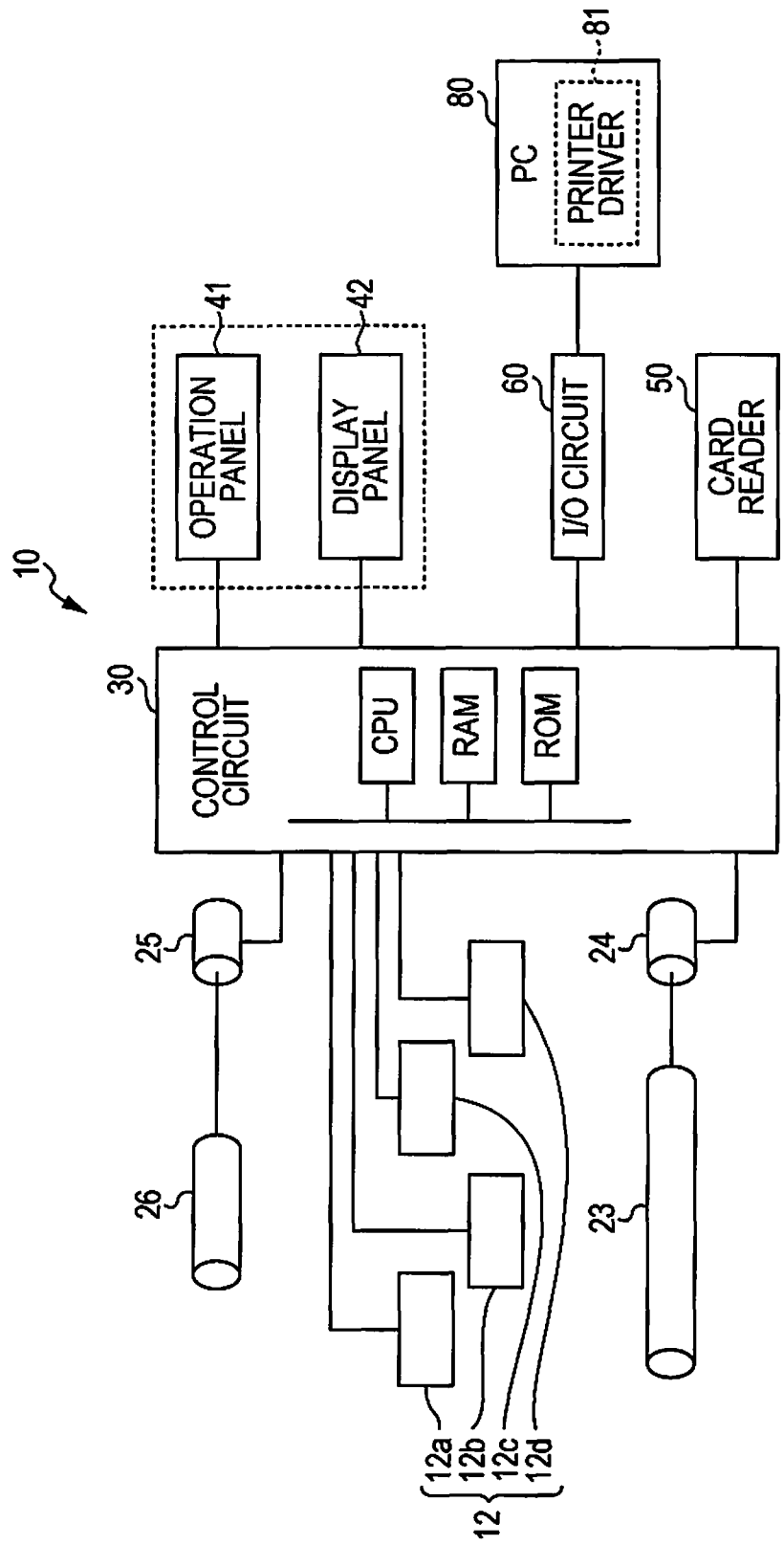
FIG. 2 is a schematic block diagram of another ink jet printer to which the invention is applied.

FIG. 2 is a schematic block diagram of another ink jet printer to which the invention is applied.

The ink jet printer includes printing heads 12 (12a to 12d) and a direction in which nozzle rows are arranged is perpendicular to a paper feeding direction. In addition, the printing heads 12a to 12d are arranged in a zigzag pattern so that bandwidths at end portions thereof partially overlap each other. Unlike the serial printer illustrated in FIG. 1, the carriage motor 21 or the belt 22 for moving the printing heads 12 does not need to be provided. However, nozzles need to be positioned across the width of a printing paper sheet. Therefore, the plurality of printing heads 12 need to be provided. Such an ink jet printer is called a line printer.

In each of the ink jet printers illustrated in FIGS. 1 and 2, a nozzle row is constituted by a plurality of nozzles and each nozzle corresponds to a raster. Therefore, when a nozzle fails and becomes an omission nozzle, liquid droplets cannot be discharged for a corresponding raster and a white line is generated. In order to make the white line not noticeable, a nearby compensation process and a composite compensation process are used.

Figure 3:
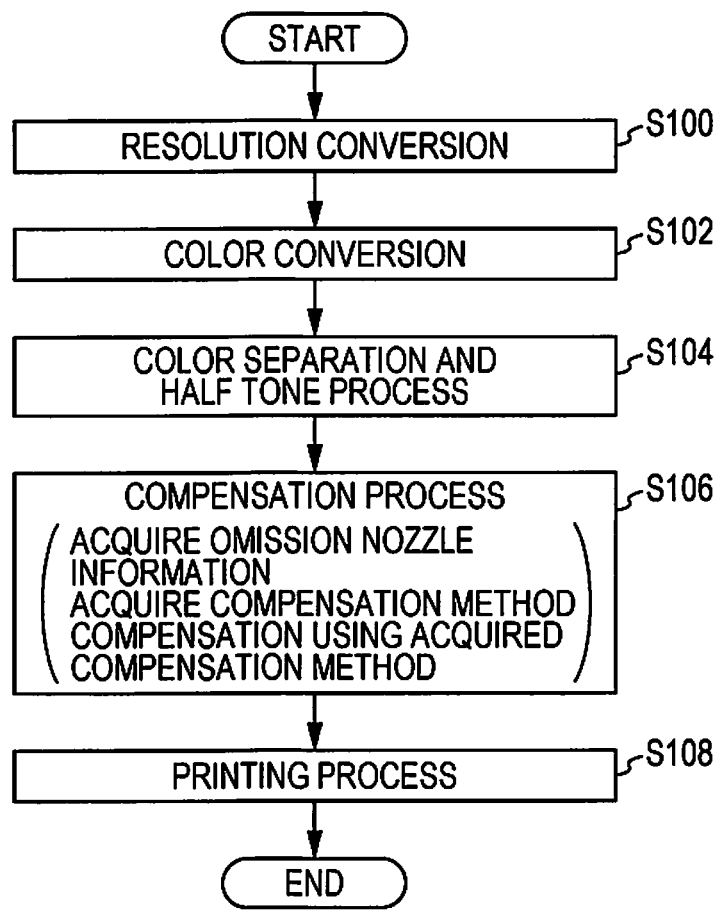
FIG. 3 is a flowchart of a printing process.
Figure 4:
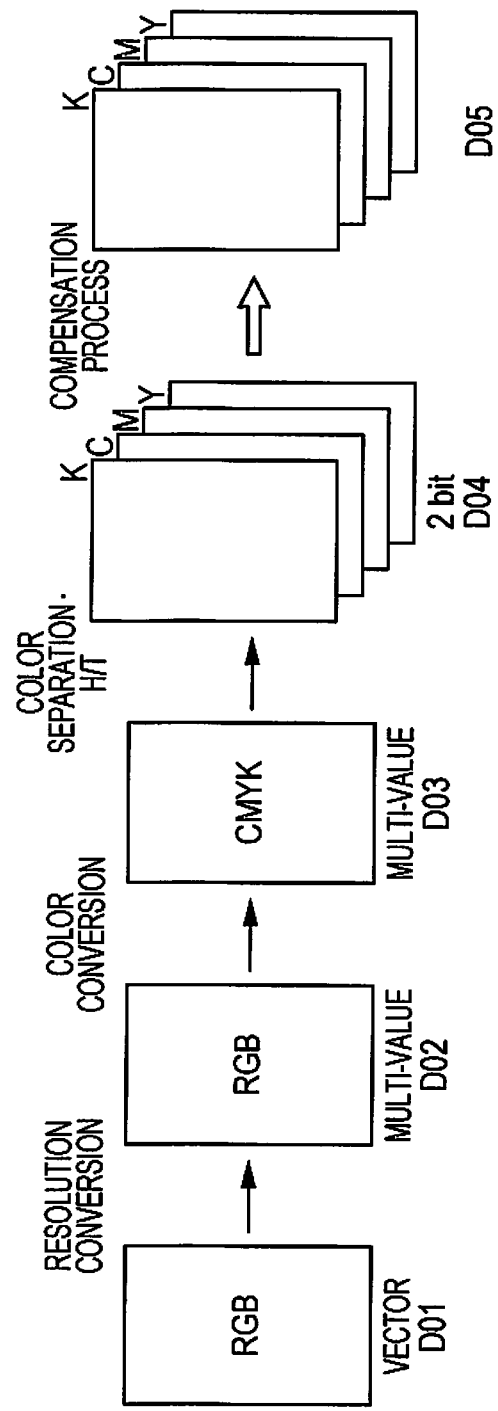
FIG. 4 is a diagram illustrating conversion of printing control data.

FIG. 3 is a flowchart of a printing process and FIG. 4 is a diagram illustrating conversion of printing control data.

The printing process is executed by the printer driver 81 of the PC 80. However, the printing process may be executed by the control circuit 30 in the printer 10. A CPU which runs a predetermined program executes the process according to the flowchart. Therefore, substantially, the PC 80 or the control circuit 30 corresponds to a controller of a liquid droplet discharging control device and executes a liquid droplet discharging control method.

In a case where printing is performed by using the PC 80, generally, an application handles RGB multi-gradation data. The printing control data may be vector data or bit map data. In a case where the printing control data is, for example, vector data D01, at the time of printing, the vector data D01 is converted into RGB multi-gradation bit map data D02 according to the resolution of the printer in S100. This conversion is called resolution conversion.

There are various types of printers such as a printer in which four colors of ink are mounted and a printer in which six colors of ink are mounted. In a case of a printer for four colors of ink (CMYK), RGB multi-gradation bit map data is converted into CMYK multi-gradation bit map data D03 according to the color of ink in the printer in S102. This conversion is called color conversion. The color conversion is executed with reference to a color conversion lookup table. After the color conversion, since the printing control data has been matched with the color of ink but the printing control data is still multi-gradation data, in S104, a half tone process of converting the printing control data into binary data which indicates whether liquid droplets are discharged or not or into 2-bit multi-value data which matches the size of a liquid droplet also is executed. In this manner, the printing control data is converted into raster data D04 which corresponds to each nozzle. With the printing control data being converted into 2-bit multi-value data, "00" indicates that no ink is discharged, "01" indicates a discharging operation for an S size, "10" indicates a discharging operation for an M size, and "11" indicates a discharging operation for a compensation size which will be described later.

Since the printing control data has been converted into the raster data, the printing control data corresponds to each nozzle of the printing heads 11 and 12. If there is an omission nozzle, since a noticeable white line is generated, a compensation process is executed in S106 so as to obtain final printing control data D05. Known examples of the compensation process include the nearby compensation process and the composite compensation process. In the related art, a compensation process expected to be desirable is applied but a compensation process is not selected while giving the actual printing environment the first priority. Note that, the printing process is executed in S108 on the basis of the final printing control data D05.

Figures 5, 6:
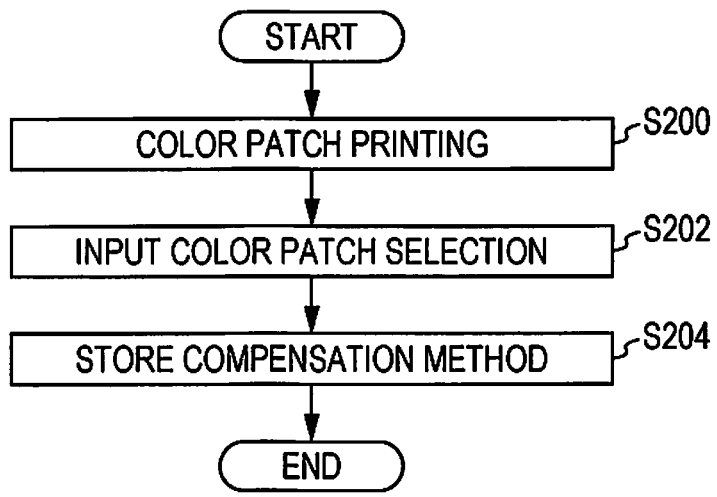
FIG. 5 is a flowchart of compensation process selection.
FIG. 6 is a diagram illustrating types of compensation methods which are applied in a case where the number of omission nozzles is one.

FIG. 5 is a flowchart of compensation process selection.

In the first embodiment, color patches are actually printed while adopting various compensation methods, printing results are confirmed, and an optimal compensation method for the printing environment is adopted.

In this process, the PC 80 performs printing of a color patch in S200, inputs color patch selection in S202, and stores a corresponding compensation method in S204. S200 corresponds to a color patch printing unit and S202 corresponds to a patch specifying unit. Note that, each color patch corresponds to a compensation method which is selected according to the infiltration way. Therefore, an operation of selecting and inputting a color patch corresponds to a parameter acquiring unit that acquires parameters corresponding to the degree of liquid spreading toward a periphery after adhesion of a liquid droplet to a medium. In addition, an operation of selecting and inputting a color patch which indicates each compensation method corresponds to a selection operation. When the corresponding compensation method is stored in S204, the compensation method to be executed is switched on the basis of information selected in S106. Therefore, a compensation switching unit which switches between execution of the nearby compensation process and execution of the composite compensation process on the basis of the parameters is constituted by the above-described components. As described above, each of the parameter acquiring unit and the compensation switching unit includes an operation panel and uses input from the operation panel. In addition, each of the parameter acquiring unit and the compensation switching unit is realized as a printer driver.

Figure 7A:
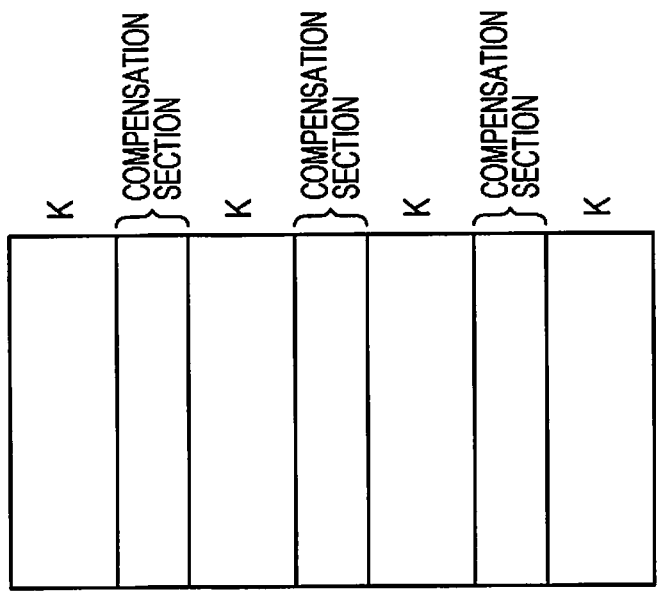
FIGS. 7A and 7B are diagrams illustrating a color patch in a case where the number of omission nozzles is one.
Figure 7B:
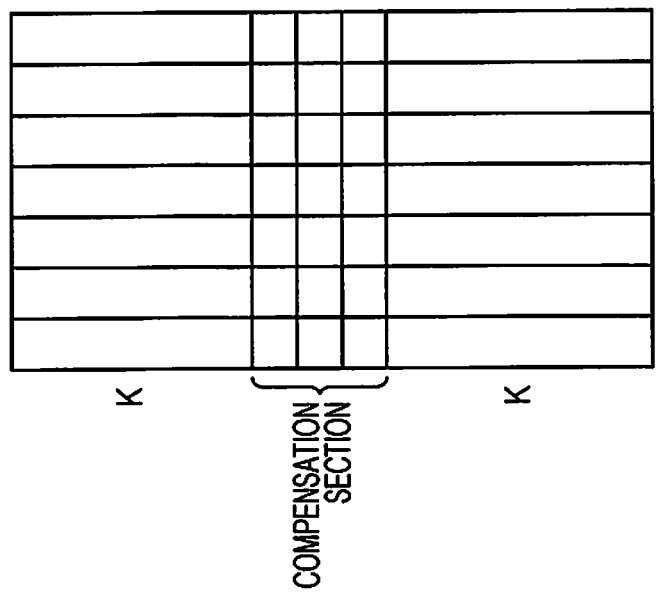

FIG. 6 is a diagram illustrating types of compensation methods which are applied in a case where the number of omission nozzles is one and FIGS. 7A and 7B are diagrams illustrating a color patch in a case where the number of omission nozzles is one.

Regarding each color patch, as illustrated in FIG. 7A, on the assumption that one lateral line which is in the approximately central position in a longitudinal direction within a longitudinally elongated rectangular region is a raster corresponding to an omission nozzle for black ink, three rasters including upper and lower rasters which are adjacent to the above-described raster are called a compensation section. FIG. 7B shows a pattern in which three compensation sections are provided in each color patch. Since the three compensation sections are formed, it becomes easy to compare the compensation sections with black-solid printing regions, which are regions other than the compensation sections.

In FIG. 6, symbols for convenience indicating the compensation methods, the types of dots to be printed for the rasters in the compensation section, the appearances of dots to be printed for the rasters in the compensation section, and the numbers of liquid droplets to be printed for the rasters in the compensation section are shown in an order from the top to the bottom. Regarding the types of dots indicating the compensation method, "L" indicates that the size of a black ink droplet is set to an L size, "X" indicates that no dot is formed, "C" indicates that a composite black dot is formed by discharging ink of CMY colors instead of black ink, and "K" indicates that nozzles other than the omission nozzle discharge black ink of the M size. In a case of the L size, two liquid droplets of the M size are discharged and the number of liquid droplets is approximately "two", and in a case of the composite black dot, three color of ink liquid droplets of the M size are discharged and the number of liquid droplets is approximately "three". Note that, in a case of the composite black dot, three colors of ink liquid droplets of the S size (which is smaller than the M size) may be discharged.

Next, the compensation method will be described specifically. In (a), L is set for the upper raster in the compensation section, X is set for the middle raster in the compensation section, and K is set for the lower raster in the compensation section. That is, the nearby compensation process is executed for the upper raster in the compensation section, no dot is formed for the middle raster in the compensation section, and black ink of the M size is discharged for the lower raster in the compensation section. Since ink adheres such that the upper raster in the compensation section covers a range larger than the original dot region, the ink reaches the middle raster in the compensation section and an effect of preventing the middle raster from becoming the white line and being noticeable can be expected.

In (b), L is set for the upper raster in the compensation section, X is set for the middle raster in the compensation section, and L is set for the lower raster in the compensation section. That is, the nearby compensation process is executed for the upper and lower rasters in the compensation section and no dot is formed for the middle raster in the compensation section. Since ink adheres such that the upper and lower rasters in the compensation section cover a range larger than the original dot region, the ink reaches the middle raster in the compensation section and an effect of preventing the middle raster from becoming the white line and being noticeable can be expected. Since a large dot is formed for each of rasters which are respectively positioned above and below the omission nozzle, an effect of more efficiently preventing the raster of the omission nozzle from becoming the white line and being noticeable in comparison with (a) can be expected.

In (c), K is set for the upper raster in the compensation section, C is set for the middle raster in the compensation section, and K is set for the lower raster in the compensation section. That is, a dot of the M size which is formed by using black ink is formed for the upper and lower rasters in the compensation section and the composite compensation process is executed for the middle raster in the compensation section. Since the composite black dot is formed for the middle raster instead of discharging black ink via the omission nozzles in the middle raster which cannot discharge black ink, it is possible to reliably prevent the white line from being generated. However, the composite black dot and black ink may be different from each other in hue. In addition, the number of liquid droplets increases.

In (d), C is set for the upper raster in the compensation section, X is set for the middle raster in the compensation section, and C is set for the lower raster in the compensation section. That is, a composite black dot is formed for the upper and lower rasters in the compensation section and no dot is formed for the middle raster in the compensation section. Although the omission nozzle in the middle raster still cannot discharge black ink, since the composite black dot is formed for each of the upper and lower rasters with a large number of liquid droplets, an effect of preventing the white line from being noticeable as with the nearby compensation process can be expected. The number of liquid droplets is also larger than the number of liquid droplets for a dot of the L size which is formed by using black ink. However, the composite black dot and a dot formed by using black ink may be different from each other in hue.

Each of (e) to (h) is a combination of above-described methods. Therefore, it can be expected that the above-described effects are combined. Note that, in each of (e) to (g), the nearby compensation process and the composite compensation process are executed together.

In addition, in (e), with respect to a predetermined dot position, the nearby compensation process in which a dot is formed on one dot position adjacent to the predetermined dot position is executed and the composite compensation process in which the dots of the plurality of different colors are overlap-printed on the other dot position adjacent to the predetermined dot position is executed.

Furthermore, in (d), (e), and (h), the composite compensation process in which the dots of the plurality of different colors are overlap-printed on a dot position in the vicinity of the dot position formed by the predetermined nozzle is executed.

Regarding each compensation method, the result of printing under the actual printing environment varies since the original nearby compensation process and the composite compensation process are different from each other in hue and the infiltration way varies depending on the type of a medium or ink. For example, in (a), the number of liquid droplets is three and thus if a medium with a low infiltration rate or ink which does not infiltrate well is used, the dot may not spread up to the raster of the omission nozzle and the white line may remain. On the other hand, if a medium with a high infiltration rate or ink which infiltrates well is used, the dot spreads up to the raster of the omission nozzle and thus the white does not remain. In addition, the number of liquid droplets is not changed from three even after the compensation and there is no change in ejection quantity.

That is, there is no restriction on the ejection duty which is attributable to increase in ejection quantity.

In addition, although the number of liquid droplets does not directly indicate the noticeability of the white line, with the nearby compensation process and the composite compensation process being approximately combined, the printing result with respect to each color patch is gradually changed due to change in hue and change in ejection quantity.

Figure 8:
FIG. 8 is a diagram illustrating types of compensation methods which are applied in a case where the number of omission nozzles is two.
Figure 8:
Figure 8:
Figure 8:
Figure 8:
Figure 8:
Figure 8:
Figure 8:
Figure 8:
Figure 8:
Figure 8:
Figure 9:
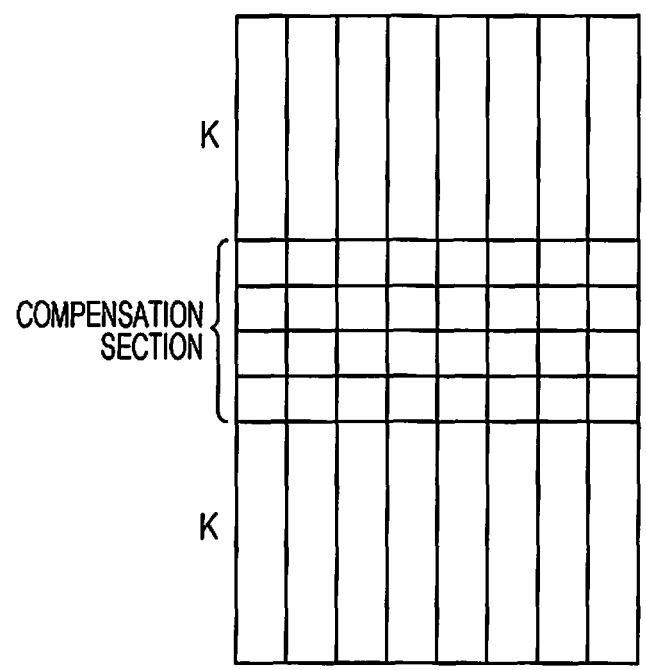
FIG. 9 is a diagram illustrating a color patch in a case where the number of omission nozzles is two.

FIG. 8 is a diagram illustrating types of compensation methods which are applied in a case where the number of omission nozzles is two and FIG. 9 is a diagram illustrating a color patch in a case where the number of omission nozzles is two.

Regarding each color patch, as illustrated in FIG. 9, on the assumption that two lateral lines which are in the approximately central position in a longitudinal direction within a longitudinally elongated rectangular region are rasters corresponding to the omission nozzle for black ink, four rasters including upper and lower rasters which are adjacent to the above-described rasters are called a compensation section. Note that, three compensation sections may be provided in each color patch as in the pattern shown in FIG. 7B.

FIG. 8 shows a plurality of compensation methods which can be applied in a case where the number of omission nozzles is two and FIG. 8 is the same as FIG. 6 in many points. However, although a dot which is formed by using black ink is not formed for two rows of rasters which correspond to the omission nozzles for black ink, it is possible to form a composite black dot for the two rows and there are variations of a position on which the composite black dot is formed. Therefore, the total number of compensation methods increases. Specifically, (c) in FIG. 6 corresponds to (c1) and (c2) in FIG. 8 and (f) in FIG. 6 corresponds to (f1), (f2), and (f3) in FIG. 8. Note that, although not shown, (g) and (h) in FIG. 8 may have variations similar to (f1), (f2), and (f3) in FIG. 8.

Figure 10:
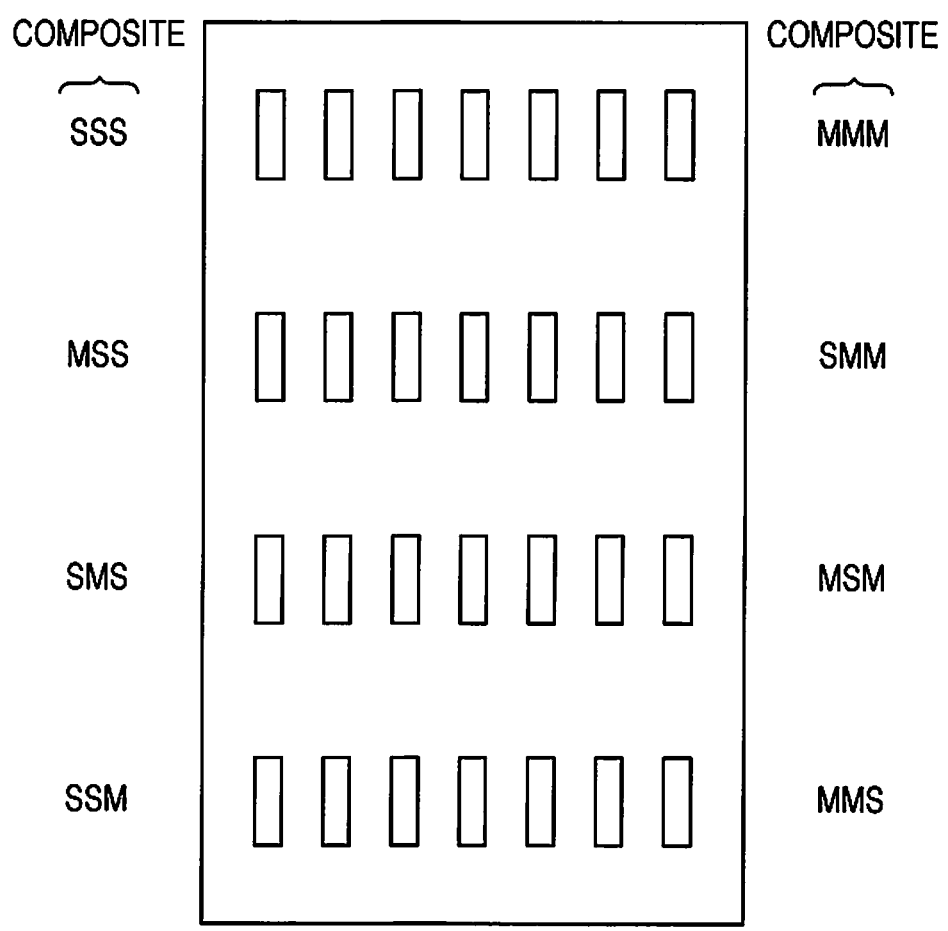
FIG. 10 is a diagram illustrating the result of printing in which color patches are disposed in one page.

FIG. 10 is a diagram illustrating the result of printing in which color patches are disposed in one page.

The compensation methods (a) to (h) are illustrated in FIG. 6 and color patches which are arranged in a lateral direction are color patches obtained by applying the compensation methods (a) to (h) thereto, respectively. In addition, four lows of color patches, in each of which the sizes of CMY dots which constitute the composite black dot have been changed, are formed in the longitudinal direction. As illustrated in the right side of the FIG. 10, the sizes of CMY dots in the uppermost color patch are all the M size. For the second color patch from the top, the S size is set for cyan ink only, for the third color patch from the top, the S size is set for magenta ink only, and for the lowermost color patch, the S size is set for yellow ink only. It is possible to provide slight deviation in hue by changing the dot size for at least one color. The medium itself also has a hue and the hue of the composite black ink is influenced by the hue of the medium or not depending on the hue of the medium. It is possible to slightly change the result of compensation by changing the balance between the amounts of ink of respective colors for forming the composite black dot.

Note that, in another example of changing a dot size, as illustrated in the left side of the FIG. 10, the sizes of CMY dots in the uppermost color patch are all the S size or the size of any of CMY dots is the M size. Specifically, for the second color patch from the top, the M size may be set for cyan ink only, for the third color patch from the top, the M size may be set for magenta ink only, and for the lowermost color patch, the M size may be set for yellow ink only. In this case, in addition to a change in hue, the ejection quantity decreases and there will be an influence of this.

Of course, it is also possible to print both color patches based on the M size and color patches based on the S size in one page so that eight rows of color patches are printed in the longitudinal direction.

FIG. 11 is a diagram illustrating an input screen (UI) of a selected color patch.

In this example, radio buttons for selecting any of the color patches are arranged in accordance with a layout of color patches in one page.

The PC 80 performs printing of a color patch in S200, displays the UI shown in FIG. 11 in S202, and stands by for input of color patch selection. The user sets a medium onto which printing is performed or ink in the printer 10, performs printing of the above-described color patch, and checks a radio button corresponding to an optimal color patch on the basis of the printing result. Then, in S204, the PC 80 stores information on the compensation method corresponding to the selected radio button. The stored information on the compensation method is referred to in S106 of the printing process. For example, it is assumed that the user feels that a color patch shown in (f) in FIG. 6 in which the sizes of dots constituting the composite black dot are all the M size is most natural while viewing the printing result. The user pushes a radio button of (f) which is in the uppermost row in the UI shown in FIG. 11. When the information is stored and the compensation process is executed in S106, as the compensation method with respect to the omission nozzle, the compensation method of (f) in FIG. 6 is applied.

As illustrated above, the infiltration rate which depends on the type of a medium or ink has a large influence on the influence of selection of the compensation method on the compensation result. It can be said that the above-described color patch selection corresponds to user's input of infiltration rate, that is, the parameters corresponding to the degree of liquid spreading toward a periphery after adhesion of a liquid droplet to a medium.

FIGS. 12A and 12B are diagrams illustrating the correspondence relationship between infiltration and density.

Even if the same type of ink is discharged and the same amount of discharged liquid droplet is discharged, the degree of liquid spreading toward a periphery after adhesion of the liquid droplet to the medium changes depending on the type of the medium or a combination of mediums. In a case of a glossy paper, a liquid droplet is likely to be absorbed in a thickness direction of the paper sheet and is not likely to spread in a direction toward a periphery. In a case where dots are intentionally disposed in a checkered pattern such that a space is provided between dots as illustrated in FIGS. 12A and 12B, the base (the white background) of the medium remains as intended. On the other hand, in a case of a plain paper, a liquid droplet is likely to be absorbed in the thickness direction of the paper sheet and is likely to spread in the direction toward a periphery. In this case, if dots are formed on the same position, the liquid droplet spreads in the direction toward a periphery and the base (the white background) of the medium decreases in size. The influence of a decrease in density which depends on the amount of ink absorbed in the thickness direction is smaller than the influence of a change in density which depends on the total area. In consideration of this, it is possible to automatically detect the inflation rate and select the compensation process.

Figure 13:
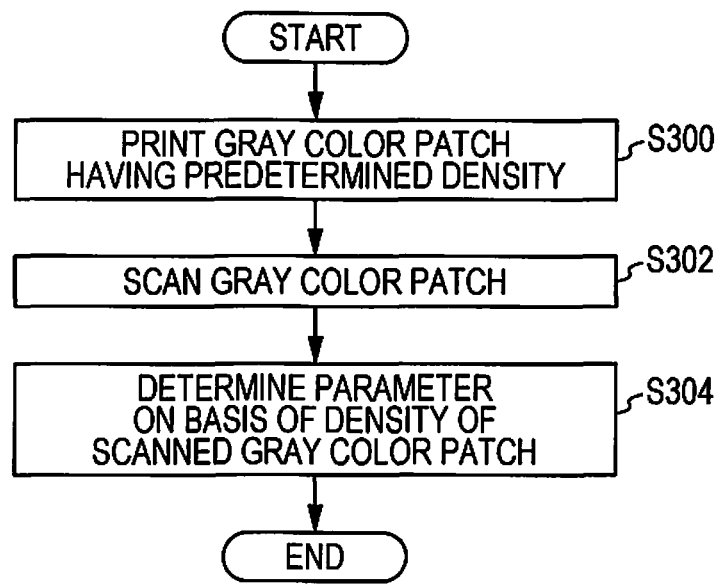
FIG. 13 is a flowchart of automatic selection of a compensation process.

FIG. 13 is a flowchart of compensation process automatic selection.

The PC 80 executes a program corresponding to the flowchart shown in FIG. 13 instead of the flowchart of the compensation process selection shown in FIG. 5.

First, in S300, a gray color patch having a predetermined density is printed. Although dots are formed on 50% of pixels in the checkered pattern shown in FIGS. 12A and 12B, this is merely an example. In order to determine the degree of liquid droplet spreading in a direction toward a periphery, the size of a dot may be set to the L size with the distance between dots being increased.

After the color patch is printed, the gray color patch is scanned and the density thereof is measured in S302. At this time, the hue may be measured. After the density is obtained, the parameters are determined on the basis of the density of the scanned gray color patch in S304. In FIG. 6, the compensation methods are arranged in the order of the number of liquid droplets. The higher the density obtained through the scanning is, that is, the higher the infiltration rate is, the closer compensation method to (a) is selected, and the lower the density obtained through the scanning is, that is, the lower the infiltration rate is, the closer compensation method to (h) is selected. Specifically, a table in which densities and compensation methods are correlated to each other may be prepared in advance so that a compensation method is determined using a density obtained through the scanning as the parameters.

In addition, in a case where it is possible to measure the hue, the hue balance between cyan, magenta, and yellow may be focused on and in a case where any one of cyan, magenta, and yellow is more intense than others, a compensation method with which it is possible to correct this by changing the size of the composite black dot may be selected. For example, in a case where it is found that cyan is intense as a result of measurement of the hue, a compensation method which uses the composite black dot in which the M size is set for magenta and yellow and the S size is set for cyan may be selected. On the other hand, in a case where it is found that cyan is weak, a compensation method which uses the composite black dot in which the S size is set for magenta and yellow and the M size is set for cyan may be selected.

In this case, S300 corresponds to a gray patch printing unit that is caused to print a gray color patch having a predetermined density, S302 corresponds to a gray patch scanning unit that scans the gray color patch, and S304 corresponds to a parameter conversion unit that acquires parameters corresponding to the degree of liquid spreading toward a periphery after adhesion of a liquid droplet to a medium on the basis of the density of the scanned gray color patch.

Note that, it is needless to say that the invention is not limited to the above embodiment. In addition, it will be apparent to one of ordinary skill in the art that the following matters are disclosed as an embodiment of the invention.

To appropriately modify the combination of mutually substitutable members and structures disclosed in the above-mentioned embodiments and to apply the modification result.

To substitute members and structures disclosed in the above-mentioned embodiments with members and structures which are not disclosed in the above-mentioned embodiments but in known technologies or to modify the combination there of and to apply the modification result.

To substitute members and structures disclosed in the above-mentioned embodiments with members and structures which are not disclosed in the above-mentioned embodiments but which can be replacements of the members and structures disclosed in the above-mentioned embodiments on the basis of known technologies or to modify the combination there of and to apply the modification result.

This application claims priority under 35 U.S.C. § 119 to Japanese Patent Application No. 2016-065209, filed Mar. 29, 2016. The entire disclosure of Japanese Patent Application No. 2016-065209 is hereby incorporated herein by reference.

What is claimed is:

1. A liquid droplet discharging control device which causes a liquid droplet discharging apparatus including a head, in which a plurality of nozzles are arranged in a predetermined direction, to perform printing, the liquid droplet discharging control device comprising:

a print control unit configured to execute a nearby compensation process, a composite compensation process or a combination of the nearby compensation process and the composite compensation process, such that a nearby nozzle in the vicinity of an omission nozzle for black ink forms a dot to compensate for a dot omission position in the nearby compensation process, and dots of a plurality of different colors are overlap-printed on the dot omission position in the composite compensation process;

a parameter acquiring unit configured to acquire parameters corresponding to the degree of liquid spreading toward a periphery after adhesion of a liquid droplet to a medium, the parameter acquiring unit including
a color patch printing unit configured to print a plurality of color patches, which have been subject to different compensation processes for compensating the dot omission position, and
a patch specifying unit configured to receive a user's operation of selecting one of the color patches, wherein
the parameter acquiring unit acquires the parameters corresponding to the color patch specified by the patch specifying unit; and a compensation switching unit configured to switch between execution of the nearby compensation process, execution of the composite compensation process, and execution of combination of the nearby compensation process and the composite compensation process on the basis of the parameters.

2. The liquid droplet discharging control device according to claim 1,
wherein the parameter acquiring unit stands by for input of a selection operation of selecting a compensation process and acquires parameters corresponding to the selection operation.

3. The liquid droplet discharging control device according to claim 1,
wherein, in the composite compensation process, the size of a dot is changed for at least one of the plurality of different colors.

4. The liquid droplet discharging control device according to claim 1,
wherein the nearby compensation process and the composite compensation process are executed together with respect to the predetermined dot position.

5. The liquid droplet discharging control device according to claim 1,
wherein, with respect to the predetermined dot position, the nearby compensation process in which a dot is formed on one dot position adjacent to the predetermined dot position is executed and the composite compensation process in which the dots of the plurality of different colors are overlap-printed on the other dot position adjacent to the predetermined dot position is executed.

6. The liquid droplet discharging control device according to claim 1,
wherein, in the composite compensation process, the dots of the plurality of different colors are overlap-printed on a dot position in the vicinity of the dot position on which the predetermined nozzle forms a dot.

7. The liquid droplet discharging control device according to claim 1,
wherein each of the parameter acquiring unit and the compensation switching unit includes an operation panel.

8. The liquid droplet discharging control device according to claim 1,
wherein each of the parameter acquiring unit and the compensation switching unit is realized as a printer driver.

9. A liquid droplet discharging control method which causes a liquid droplet discharging apparatus including a head, in which a plurality of nozzles are arranged in a predetermined direction, to perform printing, the liquid droplet discharging control method comprising:
executing a nearby compensation process, a composite compensation process or a combination of the nearby compensation process and the composite compensation process, such that a nearby nozzle in the vicinity of an omission nozzle for black ink forms a dot to compensate for a dot omission position in the nearby compensation process, and dots of a plurality of different colors are overlap-printed on the dot omission position in the composite compensation process;
acquiring parameters corresponding to the degree of liquid spreading toward a periphery after adhesion of a liquid droplet to a medium by printing a plurality of color patches, which have been subject to different compensation processes for compensating the dot omission position, receiving a user's operation of selecting one of the color patches and acquiring the parameters corresponding to the color patch selected by the user; and
switching between execution of the nearby compensation process, execution of the composite compensation process, and execution of combination of the nearby compensation process and the composite compensation process on the basis of the parameters.

10. A liquid droplet discharging apparatus which includes a head, in which a plurality of nozzles are arranged in a predetermined direction, the liquid droplet discharging apparatus comprising:
a print control unit configured to execute a nearby compensation process, a composite compensation process or a combination of the nearby compensation process and the composite compensation process, such that a nearby nozzle in the vicinity of an omission nozzle for black ink forms a dot to compensate for a dot omission position in the nearby compensation process, and dots of a plurality of different colors are overlap-printed on the dot omission position in the composite compensation process;
a parameter acquiring unit configured to acquire parameters corresponding to the degree of liquid spreading toward a periphery after adhesion of a liquid droplet to a medium, the parameter acquiring unit including
a color patch printing unit configured to print a plurality of color patches, which have been subject to different compensation processes for compensating the dot omission position, and
a patch specifying unit configured to receive a user's operation of selecting one of the color patches, wherein
the parameter acquiring unit acquires the parameters corresponding to the color patch specified by the patch specifying unit; and
a compensation switching unit configured to switch between execution of the nearby compensation process, execution of the composite compensation process, and execution of combination of the nearby compensation process and the composite compensation process on the basis of the parameters.

* * * * *